Sept. 6, 1966     W. J. D. ESCHER     3,270,499

INJECTOR ASSEMBLY FOR LIQUID FUELED ROCKET ENGINES

Filed Jan. 23, 1964     3 Sheets-Sheet 1

WILLIAM J. D. ESCHER,
INVENTOR.

BY

ATTORNEYS

Sept. 6, 1966  W. J. D. ESCHER  3,270,499
INJECTOR ASSEMBLY FOR LIQUID FUELED ROCKET ENGINES
Filed Jan. 23, 1964  3 Sheets-Sheet 2

WILLIAM J. D. ESCHER,
*INVENTOR.*

BY

ATTORNEYS

WILLIAM J. D. ESCHER,
INVENTOR.

ATTORNEYS

United States Patent Office 3,270,499
Patented Sept. 6, 1966

3,270,499
INJECTOR ASSEMBLY FOR LIQUID FUELED ROCKET ENGINES
William J. D. Escher, Woodland Hills, Calif., assignor to the United States of America as represented by the Administrator of the National Aeronautics and Space Administration
Filed Jan. 23, 1964, Ser. No. 339,825
9 Claims. (Cl. 60—35.6)

The invention described herein may be manufactured and used by or for the government of the United States of America for governmental purposes without the payment of any royalties thereon or therefore.

This invention relates to an injector assembly and, more particularly, to a propellant injection assembly having removable and replaceable parts which is used in liquid fueled rocket engines.

This invention is concerned with that class of rocket engines which utilize liquid propellants fed under pressure through a supply system into a thrust chamber where they are mixed and burned to form hot gases under high pressure. These liquid propellants usually consist of a liquid oxidizer and a liquid fuel such as, for example, liquid hydrogen or kerosene.

The thrust chamber in a rocket engine, where the mixing and burning of the fluid propellants occur, generally consists of an injector, a combusion chamber and an outlet nozzle. The function of the injector portion of the engine is to introduce and meter the flow of propellants to the combustion chamber in such a manner that an atomized fuel/oxidizer mixture which can be readily vaporized and burned, is produced. Thus it is seen that the function of the injector is quite similar to that of a carburetor in an internal combustion engine. In the outlet nozzle portion of the thrust chamber, the velocity of the gases or fluids which are produced by the burning that occurs within the combustion chamber is greatly increased and then ejected into the medium surrounding the rocket engine. The ejection of the hot gases from the outlet nozzle of the rocket engine at such high velocities imparts momentum to the system in which the engine is mounted.

Presently the injection system for rocket engines is fabricated in a permanent manner with the various parts being welded or brazed together to form a single, unitary structure. Such an injector system is exemplified by Patent No. 2,928,236 issued to Kircher et al. in which two sets of tubes are joined into a "bundle" having orifices on the combustion chamber side of the injector. At the other end or side one set of tubes communicates with a manifold containing one of the two propellants. The other set of tubes communicates with the second manifold containing the other propellant. As can be readily seen, the fabrication of such a "bundle" is not only extremely difficult and expensive, but also results in a device which is relatively heavy. However, the most objectionable characteristics of this type of construction as far as research and development activities are concerned are: (1) The injector is difficult to repair if localized damage to the injector face occurs and (2) the units once assembled, cannot be readily modified for changing injection conditions.

The present invention overcomes the above enumerated shortcomings of prior known injector systems for replacing the unitary injector assembly with a simple backplate having a plurality of apertures into which replaceable propellant injection nozzles are removably fitted. Each injection nozzle includes a passageway communicating at one end with a first propellant manifold and at the other end with the combustion chamber. Flanges extending outwardly in a plane parallel to the plane of the backplate are formed on the end of the injection nozzles which faces the combustion chamber. These flanges define the outer wall of a second propellant manifold whose inner wall is the backplate. Adjacent nozzles and their flanges are spaced from one another to form openings of a controlled size thereby providing a propellant passageway from the second manifold to the combustion chamber.

Accordingly it is an object of this invention to provide an injection system in which the elements are readily removable and replaceable.

It is another object of this invention to provide an injection system having a minimum number of element types and which is easily and inexpensively fabricated.

Still another object of this invention is to provide an injection system which may be repaired and modified easily, inexpensively and in a very short period of time.

These and other objects and advantages of this invention will become more apparent upon reference to the following description, appended claims and drawings wherein:

In order to better understand the construction and use of this novel injection system it will be described in relation to a hydrogen fueled rocket engine. However, it is obvious that this injection system may be used wherever it is desired to mix two or more fluids. These other uses will be readily apparent to those skilled in the art.

Figure 1:
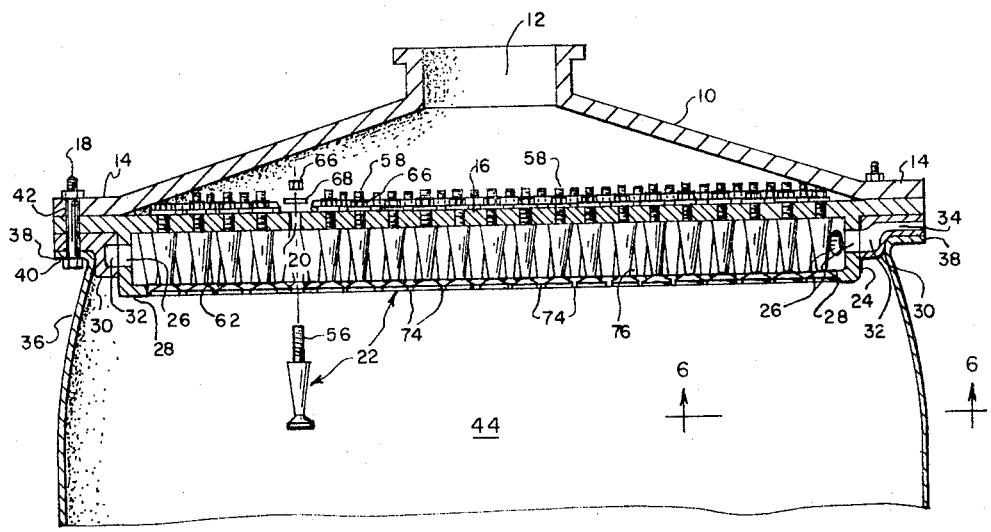
FIGURE 1 is a partly sectional side elevation of the injection system showing one of the replaceable nozzles removed.

With continued reference to the accompanying figures wherein like numerals designate similar parts throughout the various views, and with initial attention directed to FIGURE 1, reference numeral 10 designates a cone shaped propellant chamber or manifold having a propellant inlet 12 at its apex and a flanged portion 14 extending outwardly from its open base. A backplate or supporting plate 16 is secured across the open side of chamber 10 by nut and bolt fastening elements 18, although it is readily apparent that other means may be utilized as the fastening element. For example, the various flanges, manifold and backplate may be riveted or clipped together. Extending through backplate 16 are a plurality of apertures 20 into which injection nozzles 22 are removably mounted.

Figure 6:
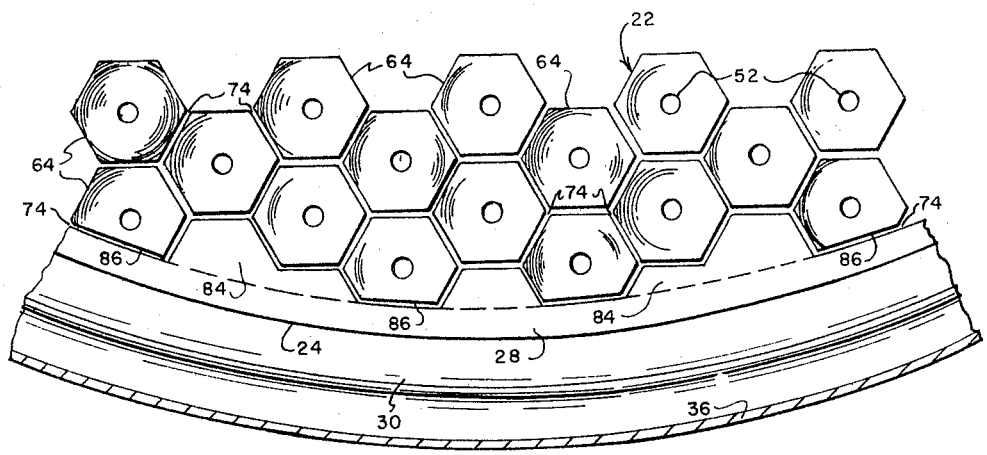
FIGURE 6 is a fragmented end elevation of the injector system of FIGURE 1.

Depending from the outer portion of the backplate 16 is a ring 24 having a plurality of apertures 26 spaced along its periphery. As best shown in FIGURES 1 and 6, the lower edge 28 of ring 24 is turned inwardly and machine contoured to the shape of the outer periphery of the array of nozzles 22.

A manifold 30 including a propellant passageway 32 and inlet 34 is secured to the periphery of the ring 24 by fastening elements 18. The manifold 30 is aligned with respect to the ring 24 so that the propellant may flow through inlet 34 to the passageway 32 and hence through the various apertures 26.

Fastening elements 18, which as illustrated are preferably nut and bolt assemblies, also serve to secure the wall 36 to the injector assembly. As shown in FIGURE 1, the upper end wall 36 is bent over to form a flange 38 nesting within an indentation in the manifold 30. At spaced points along the flange, apertures 40 are aligned with other apertures in the manifold 30, backplate 16 and flange 14 to define an opening 42 receiving the fastening elements 18. From the flange 38 the wall 36 curves outwardly and downwardly to form a combustion chamber 44.

Figure 2:
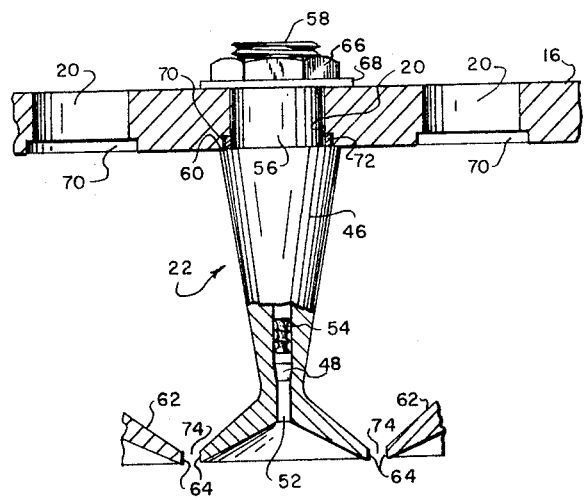
FIGURE 2 is a fragmentary side elevation partly in section of an injection nozzle according to one embodiment of the invention, removably fitted into a backplate.

The injection nozzle 22 of the embodiment of the invention illustrated in FIGURES 2 and 6 includes a tapered body portion 46 having a propellant passageway 48 extending from the inlet 50 to the outlet 52. Optionally mounted within the passageway is a swirler element 54 which accelerates the flow of propellant. The inlet end of the nozzle 22 includes a shank portion 56 which is threaded at 58 and is divided from the body portion 46 by a shoulder 60. The outlet end of the nozzle is flared into a hexagonally shaped flange 62 lying in a plane parallel to the plane of backplate 16 and having vertical faces 64 about its outer periphery. The shank portion 56 of nozzle 22 is received in the aperture 20 with the threaded portion 58 extending above the upper surface of the backplate 16. A nut 66 is removably threaded onto shank portion 56 and drawn into firm contact with a securing member such as a lock nut 68. Shoulder 60 forms, with an annular notch 70 and the shank 56, a toric shaped space into which a suitable elastomeric or metal seal 72 is fitted.

While element 66 is described as a nut it is obvious that any other removable fastening means is acceptable. For example a threadless nut such as a Tinnerman fastener may be satisfactorily utilized.

As can be clearly seen in FIGURES 1 and 2, when the nozzles 22 are secured in place, the vertical faces 64 of hexagonally shaped flanges 62 are spaced from one another to form slots or openings 74 communicating with the combustion chamber 44. Thus a chamber or manifold 76 is formed between backplate 16, ring 24, and flanges 62 into which a propellant can flow from the manifold passage 32 and ring apertures 26. The propellant contained in the chamber 76 can now pass through the openings 74 into the combustion chamber 44 where it is burned thereby producing a hot gas under pressure.

Figure 3:
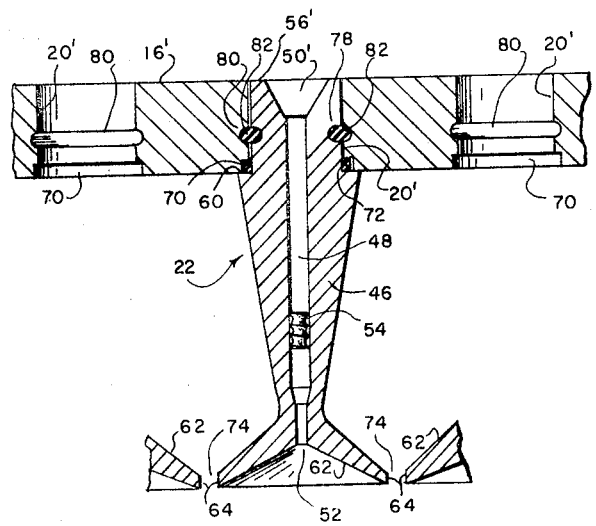
FIGURE 3 is a cross sectional view of a fragmentary side elevation showing an injection nozzle according to another embodiment of the invention, removably fitted into a backplate.
Figure 4:
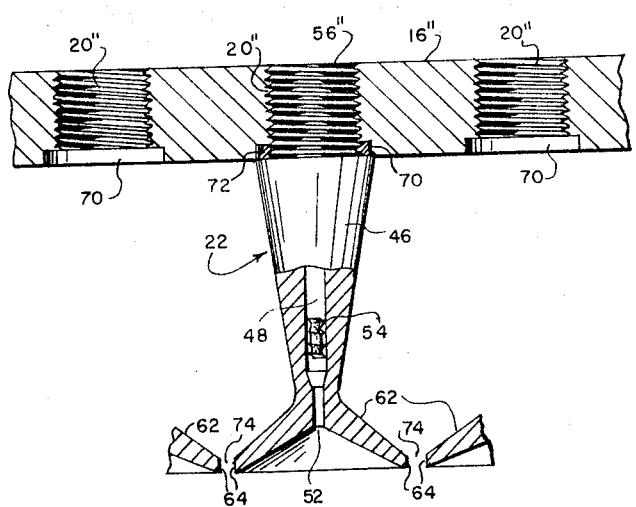
FIGURE 4 is a fragmentary side elevation partly in section of an injection nozzle according to still another embodiment of the invention, removably fitted into a backplate.
Figure 5:
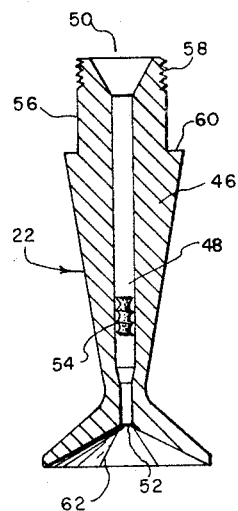
FIGURE 5 is a sectional view of the removable injection nozzle shown in FIGURES 1 and 2.

The nozzles 22 of the embodiments of the invention illustrated in FIGURES 3 and 4 are like the nozzle shown in FIGURES 2 and 6 except for modifications to the shank portion thereof to accomodate securing means other than a threaded nut. In the embodiment illustrated in FIGURE 3, an annular notch 78 is formed in the shank portion 56' to cooperate with a similar annular notch 80 formed in the wall of aperture 20' in the backplate 16'. An elastomeric element 82 is disposed in tight fitting engagement with one of the notches so that when aligned with the other notch it expands and thereby securely attaches the nozzle 22 to the backplate 16'. If the nozzle 22 is to be removed from the aperture 20', a force directed outwardly from the backplate is applied to the flange end 62 whereupon the elastomeric element 82 will compress and deform sufficiently to allow it to be withdrawn from one of the notches. Thereafter, only the friction between the shank or aperture walls and the elastomeric element need be overcome to completely disengage the nozzle from the backplate.

In the embodiment shown in FIGURE 4, the apertures 20″ in the backplate 16″ are threaded to complement threads formed on the shank portion 56″. Insertion of the nozzle 22 into backplate 16″ is accomplished by engaging the threads on the shank portion with the threads in the aperture and turning the nozzle until it is securely seated. Removal of the nozzle is accomplished by reversing the above procedure. Of course where this embodiment is used it must be possible to provide sufficient clearance between flanges to permit turning.

It is apparent that methods other than those illustrated may be used to secure the nozzles to the backplate. For example, a detent on either the shank or in the aperture, combined with a spring loaded ball on the other element could provide a satisfactory connection. Similarly a local brazing or welding joint can be accomplished between the shank and backplate which can be mechanically broken, melted-out, or otherwise disrupted to permit removal of the nozzle. The joint can then be remade upon insertion of a replacement nozzle.

As most clearly shown in FIGURE 6, the slots 74 may be maintained at a constant width to give an even fuel distribution and hence an even combustion. This constant width is accomplished by accurate, uniform spacing of the apertures 20 in a pattern that repeats itself every 60 degrees. Furthermore, the size of nozzle flanges 62 is uniformly maintained within prescribed limits so that the faces 64 will be spaced a predetermined distance apart when the nozzles 22 are installed in backplate 16.

Some difficulty was initially encountered in maintaining a constant slot width around the outer periphery of the nozzle array. However, as shown in FIGURE 6, this difficulty is easily overcome by contouring the inwardly turned lower edge 28 of the ring 24 to form projections 84 filling the spaces which are not large enough to accommodate a complete nozzle. A portion of flange 62 may also be cut away as shown at 86 so that the nozzles 22 which lie in the outer row of the array, can be placed more closely to ring 24. Thus, a uniform opening width may be maintained even at the edges of the injector face.

While the injector nozzles are illustrated as having hexagonally shaped flanges, it is obvious that other shapes such as triangles, squares or any other multi-sided figures may be successfully utilized. Combinations of such shapes may also be used. For example, a circular flange may be combined with a multi-sided figure having concave sides of a radius complementing the radius of the circle.

By the arrangement of elements as described an injector which is easy to repair and modify has been created. If the nozzles in one section of the injector are damaged they may be readily removed and replaced from a stock of "standard" nozzles with at most only a minor machining operation to trim flanges 62 being required before installation. To obtain a greater propellant flow through nozzle 22, the passageway 48 along with the inlet 50 and outlet 52 may be enlarged. To obtain the desired propellant flow rate from manifold 76, the width of the slots 74 can be varied by controlling the amount of material removed from the periphery of flanges 62. In the same manner the mixture ratio across the injector face may be varied by selectively trimming the flanges 62 to obtain a selected slot width and enlarging or plugging passageways 48 at selected points on the injector face.

From the above description it is apparent that a vastly improved and superior rocket fuel injection system may be produced by utilizing the teachings of this invention. The system is simple and inexpensive to manufacture since it is constructed of only four basic parts all of which may be manufactured by mass production techniques. Since the parts are uniform, any one of them may be replaced for purposes of repair or modification. By the simple expedient of machining the nozzle flanges and ring edge, the contour of these elements may be varied to increase or decrease the flow of propellant thereby varying the propellant ratio across the entire injector face or at selected points thereon. None of the above advantages could be obtained in the prior art devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning or range of equivalency of the claims are therefore intended to be embraced therein.

What is claimed and desired to be secured by United States Letters Patent is:

1. An injection system for a rocket thrust chamber including a combustion chamber comprising:
   A. a first propellant manifold having a propellant inlet and an open side;
   B. a backplate disposed across said open side and having a plurality of uniformly spaced apertures therein;
   C. an injector nozzle removably mounted in each of said apertures and extending outwardly from said manifold and terminating in an outer end,
      (1) a propellant passageway extending through each of said nozzles and opening into said combustion chamber and said first propellant manifold,
      (2) each of said nozzles having an impervious flange on said outer end forming with said backplate a second propellant manifold;
   D. a propellant inlet communicating with said second manifold; and
   E. each of said flanges having faces spaced from corresponding faces on the flange of adjacent nozzles to form the only opening communicating with said combustion chamber and said second propellant manifold whereby the propellants from the first and second manifolds are mixed and react in said combustion chamber to form gaseous reaction products under high pressure.

2. An injector assembly according to claim 1 wherein the ends of said nozzles terminate in a shank portion of reduced diameter extending through said aperture, fastening means on said shank portion so that the nozzle may be secured to said backplate and removed therefrom at will.

3. An injector system for a rocket motor including a thrust chamber comprising:
   A. a first propellant manifold having a propellant inlet and an open side;
   B. said first propellant manifold being shaped like a cone with said inlet at the apex thereof and said open side across the base thereof;
   C. a backplate disposed across said open side and having a plurality of uniformly spaced apertures therein;
   D. an injector nozzle disposed in each of said apertures and extending outwardly and terminating in an outer end remote from said first propellant manifold,
      (1) a propellant passageway extending through each of said nozzles and opening into the combustion chamber portion of said thrust chamber and said first propellant manifold,
      (2) a shank portion of reduced diameter on the ends of said nozzles remote from said outer end, extending through said aperture,
      (3) means on said shank portion for removably securing said nozzle to said backplate;
   E. an impervious flange on said outer end of each nozzle forming with said backplate a second propellant manifold;
   F. a propellant inlet communicating with said second manifold; and
   G. each of said flanges having vertical faces spaced from the vertical faces of the flanges on the adjacent nozzles thereby forming a slot of a controlled size serving as the only communication between said combustion chamber and said second propellant manifold whereby the propellants from the first and second manifolds are mixed and react in said combustion chamber to form gaseous reaction products under high pressure.

4. An injector assembly according to claim 3 wherein said backplate includes a ring depending from its outer portion and extending outwardly and terminating in an edge lying in the plane of said outer end of said nozzles whereby slots of a controlled size are maintained around the periphery of the nozzle array.

5. An injector assembly according to claim 4 wherein said edge and the adjacent flanges are contoured to a complementary shape.

6. An injector assembly according to claim 3 wherein said shank portion extends above the surface of said backplate and said securing means is removably mounted on said shank portion above the surface of said backplate.

7. An injector assembly according to claim 3 wherein said securing means comprises securing means on said shank portion cooperating with securing means in said aperture.

8. An injector assembly according to claim 3 wherein said securing means comprises an elastomeric member tightly fitted into an enclosed space formed by an annular notch on said shank portion facing a similar annular notch in the wall of said aperture.

9. An injector assembly according to claim 3 wherein said securing means comprises cooperating threads on said shank and in the wall of said aperture.

References Cited by the Examiner

UNITED STATES PATENTS

| | | | |
|---|---|---|---|
| 1,945,298 | 1/1934 | Schmidt. | |
| 3,071,925 | 1/1963 | Ledwith et al. | 60—39.74 X |
| 3,132,481 | 5/1964 | Hasbrouck et al. | 60—39.46 |
| 3,147,592 | 9/1964 | Rose | 60—35.6 X |
| 3,216,693 | 11/1965 | Hook | 60—35.6 X |

MARK NEWMAN, *Primary Examiner.*

D. HART, *Assistant Examiner.*